US007856867B2

(12) United States Patent
Lucido et al.

(10) Patent No.: US 7,856,867 B2
(45) Date of Patent: Dec. 28, 2010

(54) INJECTOR CONTROL PERFORMANCE DIAGNOSTIC SYSTEMS

(75) Inventors: Michael J. Lucido, Northville, MI (US); Wenbo Wang, Novi, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/366,955

(22) Filed: Feb. 6, 2009

(65) Prior Publication Data

US 2010/0199752 A1 Aug. 12, 2010

(51) Int. Cl.
*G01M 15/00* (2006.01)

(52) U.S. Cl. .................................................. 73/114.45

(58) Field of Classification Search .............. 73/114.45, 73/114.58, 114.77

See application file for complete search history.

(56) References Cited

U.S. PATENT DOCUMENTS 4,589,401 A * 5/1986 Karim et al. ................ 123/479
4,736,267 A * 4/1988 Karlmann et al. ........... 361/101
4,932,246 A * 6/1990 Deutsch et al. .......... 73/114.45
5,172,588 A * 12/1992 Umemoto ................ 73/114.45
5,203,868 A * 4/1993 Ono ........................ 73/114.45
5,241,933 A * 9/1993 Morikawa ............... 123/198 D
5,469,825 A * 11/1995 Golab et al. ................ 123/479
5,687,694 A * 11/1997 Kanno ........................ 123/479
6,754,604 B2 * 6/2004 Weiland ..................... 702/114
6,761,059 B2 * 7/2004 Hsia et al. ................ 73/114.45
7,252,072 B2 * 8/2007 Slater et al. ................. 123/479
7,430,899 B2 * 10/2008 Kekedjian et al. ........ 73/114.45
7,497,204 B2 * 3/2009 Perryman et al. ........... 123/479

* cited by examiner

*Primary Examiner*—Freddie Kirkland, III

(57) ABSTRACT

A diagnostic system for a fuel injector control system according to the present disclosure includes a plurality of state monitoring modules and a fault determination module. The plurality of state monitoring module monitor a plurality of states of a driver circuit for a fuel injector based on data samples related to the plurality of states. The fault determination module diagnoses a fault in the driver circuit when at least one of the plurality of state monitoring modules receives a predetermined number of data samples indicating an undesired state within a sampling interval.

12 Claims, 4 Drawing Sheets

INJECTOR CONTROL PERFORMANCE DIAGNOSTIC SYSTEMS

FIELD

The present disclosure relates to fuel injector control systems, and more particularly to diagnostic systems for fuel injector control systems in direct injection engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In direct injection engines, fuel is directly injected into cylinders. Spark ignition direct injection (SIDI) engines are one type of direct injection engines. SIDI engines may include a high pressure fuel injection system that sprays fuel directly into a specific region within a combustion chamber of each cylinder. A homogeneous or stratified charge may be created in the combustion chamber depending on engine operating conditions.

In SIDI engines, fuel may be injected into the combustion chamber in such a way that a small amount of fuel is placed in the vicinity of a spark plug for each cylinder. The air-fuel mixture in the vicinity of the spark plug is surrounded mostly by air, but is a fuel-rich mixture and can be ignited by the spark plug. Therefore, the SIDI engines can be operated in an ultra-lean-burn mode with an air fuel ratio as high as 65:1, as opposed to the stoichiometric ratio (14.7:1 for gasoline engines, for example) for normal operations where the fuel is homogeneously dispersed in the cylinder.

Fuel injectors inject fuel into cylinders of a SIDI engine according to timing and pulse widths that are determined by an electronic control module (ECM). A driver circuit energizes solenoid coils of the fuel injectors in response to the injection command pulse from the ECM. When the solenoid coils are energized, the injector valves of the fuel injectors are opened for a duration to allow the fuel to enter the combustion chambers of the cylinders. SIDI engines require accurate control of energizing current through the solenoid coils via the driver circuit to ensure a proper spray pattern and vaporization of the fuel.

SUMMARY

A diagnostic system for a fuel injector control system according to the present disclosure includes a plurality of state monitoring modules and a fault determination module. The plurality of state monitoring modules monitor a plurality of states of a driver circuit for a fuel injector based on data samples related to the plurality of states. The fault determination module diagnoses a fault in the driver circuit when at least one of the plurality of state monitoring modules receives a predetermined number of data samples indicating an undesired state within a sampling interval.

In other features, the plurality of states include an initialized state, an un-initialized state, a driving state, a non-driving state, and a voltage. The undesired state includes at least one of an un-initialized state, a non-driving state, and a voltage below a threshold.

A method of diagnosing a fuel injector control system includes receiving data samples related to a plurality of states of a driver circuit for a fuel injector, and diagnosing a fault in the driver circuit when a predetermined number of data samples indicate an undesired state within a sampling interval.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
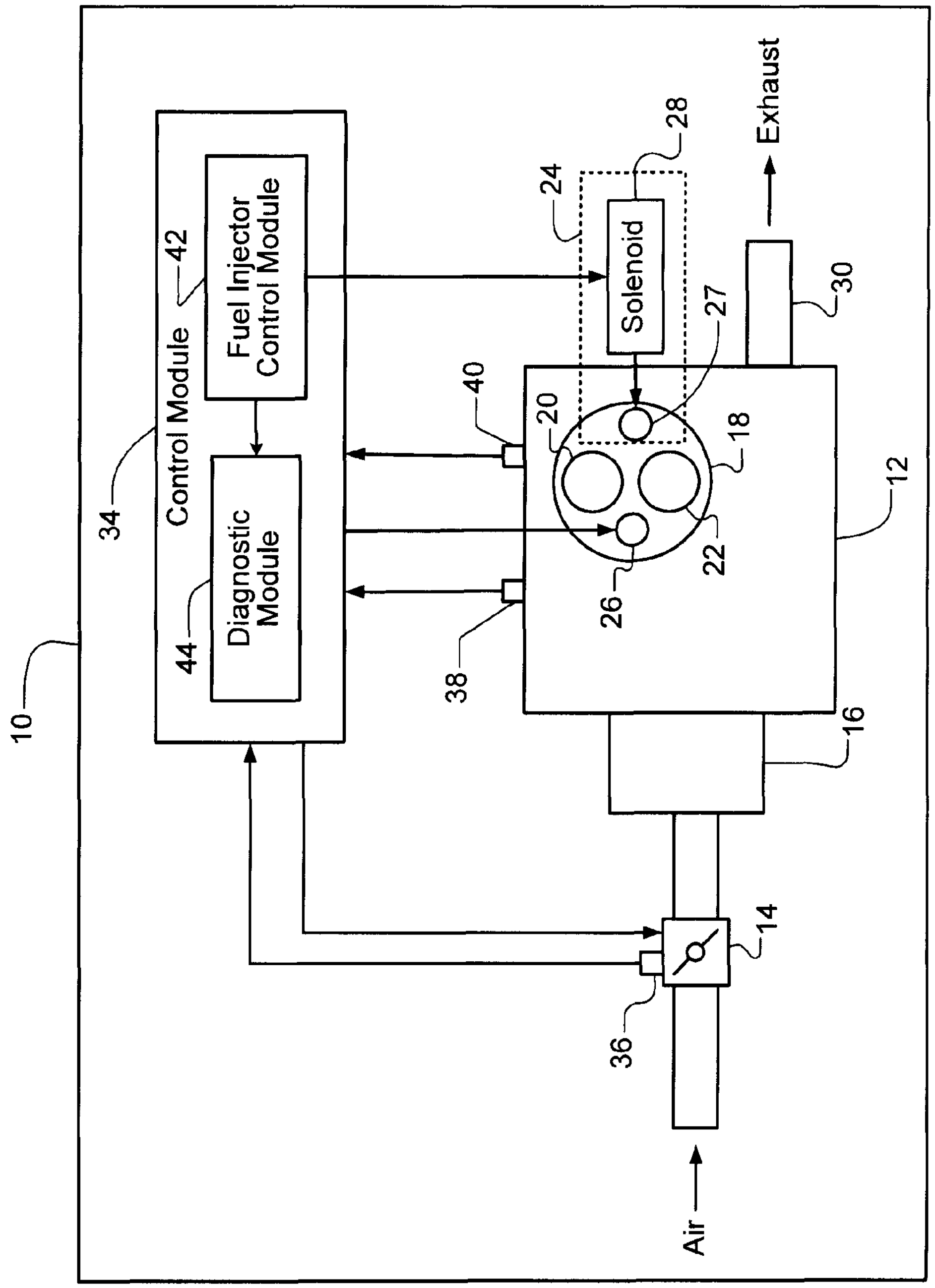
FIG. 1 is a functional block diagram of an engine system that includes a diagnostic module for a fuel injector control module according to the teachings of the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A diagnostic module for a fuel injector control module according to the teachings of the present disclosure monitors various states of a driver circuit that energizes a solenoid of a fuel injector. For example, the diagnostic system may monitor an un-initialized state of the driver circuit, a non-driving state of the driver circuit to drive a fuel injector after complete initialization, and/or a voltage level of the driver circuit below a desired boost voltage. If a predetermined number of data samples indicating any of the states are received within a sampling interval, a fault determination module diagnoses a fault in the driver circuit.

Referring now to FIG. 1, an engine system 10 includes a direct injection engine 12. The direct injection engine 12 may be a spark-ignition-direct-injection (SIDI) engine. Air is drawn through a throttle valve 14 into an intake manifold 16. The engine 12 may include multiple cylinders 18, such as, for example only, 2, 4, 6, 8, 10 and 12 cylinders. Each cylinder 18 includes an intake valve 20, an exhaust valve 22, a fuel injector 24, and a spark plug 26. The fuel injector 24 includes an injector valve 27 and a solenoid 28. For the sake of clarity, only one cylinder 18 and the corresponding intake valve 20, exhaust valve 22, fuel injector 24, and spark plug 26 are shown. It is understood and appreciated that multiple intake valves 20 and exhaust valves 22 may be provided in each cylinder 18. While the fuel injector 24 is described as a solenoid injector, the fuel injector 24 may be a piezoelectric injector. The piezoelectric injector may include a piezoelectric material that is energized to expand or contract as electric current flows across the piezoelectric material. When de-energized, the piezoelectric material returns to its original shape and size. The fuel flow rate may be controlled by controlling the amount of expansion/contraction, which is a function of electric current across the piezoelectric material.

Air from the intake manifold 16 is drawn into the cylinder 18 of the engine 12 through the intake valve 20. The fuel injector 24 injects fuel into the combustion chamber of the cylinder 18 during an intake stroke or a compression stroke depending on engine operating modes. When the solenoid 28 is energized, the injector valve 27 is opened and fuel is injected into the cylinder 18. The quantity of fuel injected into the cylinder 18 depends on the duration when the solenoid 28 is energized. After the fuel is injected, the spark plug 26 is activated to ignite the air/fuel mixture within the cylinder 18. Thereafter, the exhaust valve 22 is opened to allow exhaust gas to flow to an exhaust system 30.

A control module 34 controls the spark plug 26 and the fuel injector 24 based on signals from various sensors at the engine 12. For example only, a throttle position sensor 36, an engine speed sensor 38, and a crankshaft position sensor 40 may send signals to the control module 34 indicative of the engine operating parameters. The control module 34 includes a fuel injector control module 42 that controls the fuel injector 24 and a diagnostic module 60 that diagnoses performance of the fuel injector control module 42. While the diagnostic module 60 is described in connection with an SIDI engine, the diagnostic module 60 may be applied to a diesel engine or other types of direct injection engines.

Figure 2:
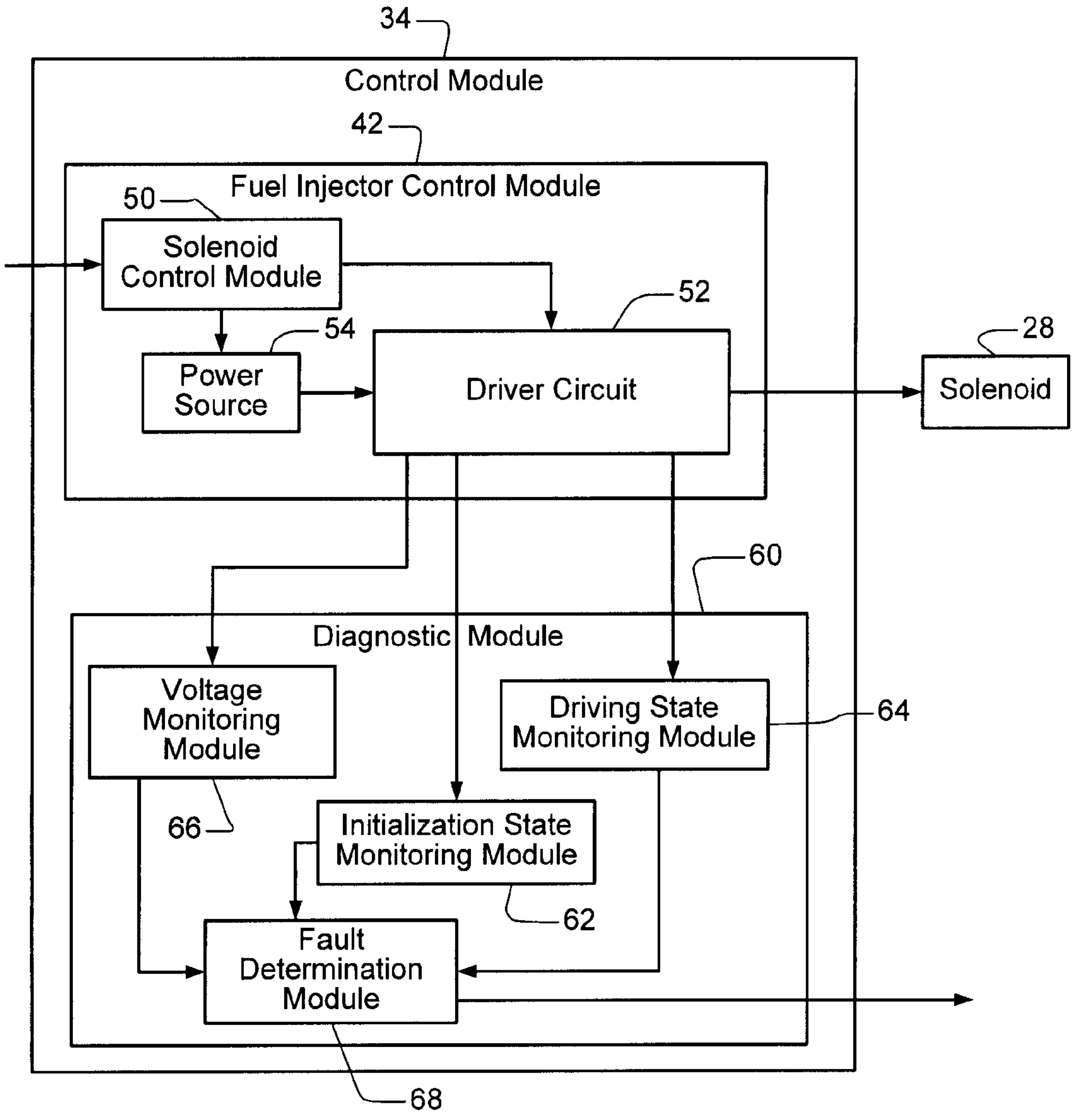
FIG. 2 is a functional block diagram illustrating a fuel injector control module and a diagnostic module for the fuel injector control module according to the teachings of the present disclosure.

Referring to FIG. 2, the fuel injector control module 42 includes a solenoid control module 50, a driver circuit 52, and a power source 54. The solenoid control module 50 may include timing and control programs and/or software to generate appropriate output signals to the driver circuit 52. The output signals may include signals related to, for example only, charging or discharge a capacitor (not shown) of the driver circuit 52, and opening or closing a switch (not shown) of the driver circuit 52. The solenoid control module 50 determines the appropriate injection timing and the injection period based on engine operating parameters and controls the solenoid 28 accordingly. The engine operating parameters relevant to determination of injection timing and period include, but are not limited to, engine speed, engine load, throttle position, and crankshaft position. The solenoid control module 50 also determines when a current command signal is issued based upon the various engine operating parameters.

The power source 54 may be a battery that supplies voltage to the driver circuit 52 (for example only, to charge a capacitor). As such, the driver circuit 52 can achieve a desired boost voltage higher than the voltage of the power source 54 to drive the solenoid 28 of the fuel injector 24.

Generally, the capacitor of the driver circuit 52 is charged to a desired boost voltage before a switch is closed to connect the driver circuit 52 to the solenoid 28. The capacitor of the driver circuit 52 may be below the desired boost voltage when the driver circuit 52 is disconnected from the power source 54 for an extended period of time or when the capacitor has otherwise discharged below the desired boost voltage. Prior to issuing a current command to the driver circuit 52, the solenoid control module 50 initializes the driver circuit 52 (for example only, to charge the capacitor) to the desired boost voltage.

After the driver circuit 52 is initialized and the voltage across the capacitor is charged to a level within a predetermined tolerance of the desired boost voltage, the solenoid control module 50 issues a current command signal to the driver circuit 52. The driver circuit 52 closes the switch to connect the capacitor to the solenoid 28 to supply current to the solenoid 28. The solenoid 28 is thus energized to open the injector valve 27. The quantity of fuel supplied to the engine 12 depends on a duration that the solenoid 28 is energized and the injector valve 27 is opened. When the switch of the driver circuit 52 is open, the solenoid 28 is de-energized and the injector valve 27 is closed.

The diagnostic module 60 for the fuel injector control module 42 includes an initialization state monitoring module 62, a driving state monitoring module 64, a voltage monitoring module 66, and a fault determination module 68. The initialization state monitoring module 62 communicates with the driver circuit 52 and determines whether the driver circuit 52 is in an initialized state or an un-initialized state. The initialization state monitoring module 62 may include a counter (timer) to check the frequency that the driver circuit 52 is in an un-initialized state. When a predetermined number of data samples indicating the driver circuit 52 in an un-initialized state are received within a sampling interval, the initialization state monitoring module 62 diagnoses a fault in initializing the driver circuit 52 and sends a first fault signal to the fault determination module 68.

The driving state monitoring module 64 communicates with the driver circuit 52 to monitor a driving state of the driver circuit 52. After complete initialization, the driver circuit 52 should be in a driving state ready to drive the solenoid 28 of the fuel injector 24. The driver circuit 52 may be in a failed state (i.e., non-driving state) to drive the solenoid 28 due to, for example only, communication error with the solenoid control module 50, internal corruption of the driver circuit 52, and invalid interface values from the solenoid control module 50. The driving state monitoring module 64 may include a counter (timer) to check the frequency that the driver circuit 52 is in a non-driving state. When a predetermined number of data samples indicating the driver circuit 52 in a non-driving state are received within a sampling interval, the driving state monitoring module 64 diagnoses a failed state in driving the solenoid 28 and sends a second fault signal to the fault determination module 68. Otherwise, the driving state monitoring module 64 records a "pass" signal in a memory of the driving state monitoring module 62.

The voltage monitoring module 66 communicates with the driver circuit 52 and monitors a voltage level of the driver circuit 52. The voltage monitoring module 66 may include a counter (timer) to check the frequency that the voltage is below a threshold (i.e., a desired boost voltage). When a predetermined number of data samples indicating a voltage below the threshold are received within a sampling interval, the voltage monitoring module 66 diagnoses a fault in boost voltage and sends a third fault signal to the fault determination module 68.

The predetermined number of data samples required to diagnose a fault in initialization, driving state and voltage level may be the same or different. The sampling intervals for the three sampling processes may be equal or different.

The driver circuit 52 includes various sensors and components to self-determine whether the driver circuit 52 is initialized, un-initialized, ready-to-drive, or not-ready-to-drive. Information about the boost voltage of the driver circuit 52 can be monitored, sampled, interrogated, and or stored directly or indirectly by or in connection with the solenoid control module 50 and/or other memory or storage. The initialization state monitoring module 62, the driving state monitoring module 64, and the voltage monitoring module 66 may receive data related to the various states of the driver circuit 52 at a predetermined rate, for example only, every 12.5 msec.

When the fault determination module 68 receives a fault signal (first, second or third signal) from any of the initialization state monitoring module 62, the driving state monitoring module 64 and the voltage monitoring module 66, the fault determination module 68 diagnoses a fault in the driver circuit 52. In response to this diagnosis, the control module 34 may disable the engine 12 and the injectors 24 to prevent further damage to the driver circuit 52.

Figure 3A:
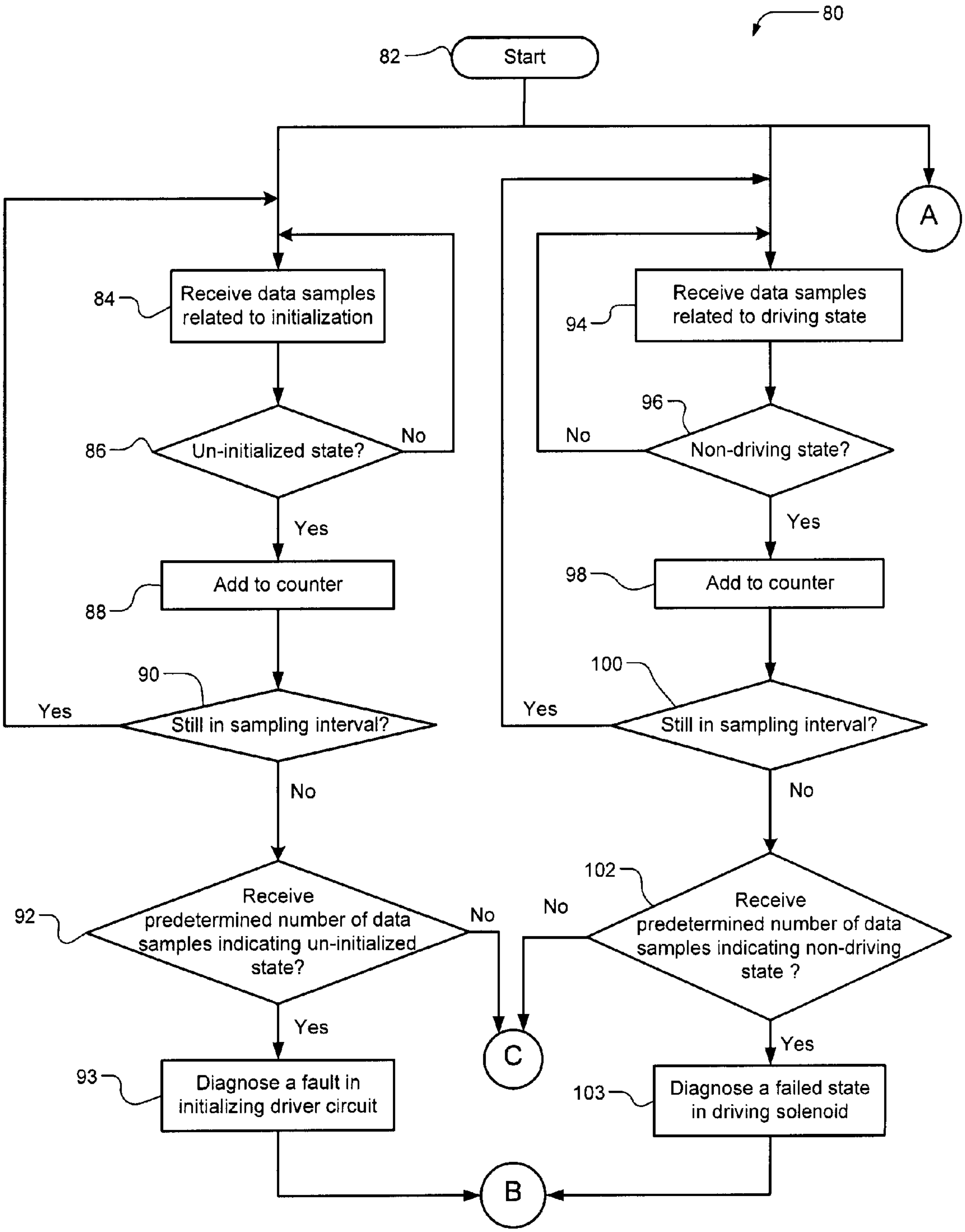
FIGS. 3A and 3B are a flow diagram illustrating exemplary steps of a method of diagnosing a fuel injector control module according to the teachings of the present disclosure.
Figure 3B:
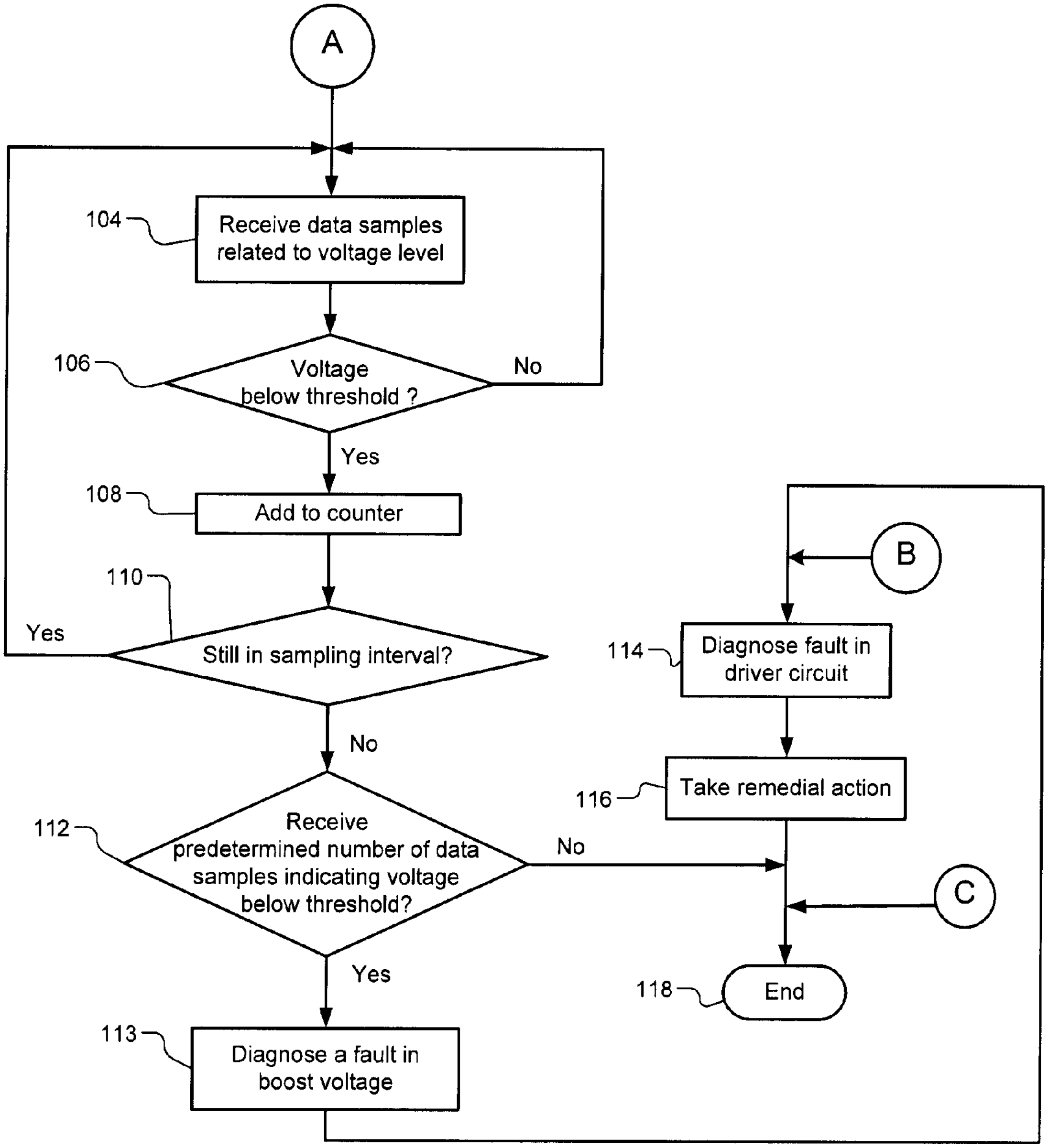

Referring now to FIGS. 3A and 3B, a method 80 of diagnosing the fuel injector control module starts in step 82 and starts with three parallel sampling processes. The three sampling processes start from steps 84, 94, and 104, respectively, and receive data samples indicating various states of the driver circuit 52.

In the first sampling process, the initialization state monitoring module 62 receives data samples related to initialized or un-initialized state of the driver circuit 52 in step 84. When the data sample indicates an initialized state in step 86, the first sampling process returns to step 84 to continue the sampling process. When the data sample indicates an un-initialized state, a counter counts the number of times the driver circuit 52 is in an un-initialized state in step 88. When a predetermined number of data samples indicating an un-initialized state are received in a sampling interval in step 90, the initialization state monitoring module 62 diagnoses a fault in initializing the driver circuit 52 in step 92. If a predetermined number of data samples indicating an un-initialized state are not received in step 90, the sampling process goes to step 93 to determine whether the sampling process is still in the sampling interval. When the sampling process is still within the sampling interval in step 93, the sampling process returns to step 84 to continue the sampling process. When the sampling interval expires in step 93. The first sampling process goes to step 118.

In the second sampling process, the driving state monitoring module 64 receives data samples related to a driving state of the driver circuit 52 in step 94. When the data sample indicates a driving state in step 96, the sampling process returns to step 94 to continue sampling. When the data sample indicates a non-driving state in step 96, a counter counts the number of times the driver circuit 52 is in a non-driving state in step 98. When a predetermined number of data samples indicating a non-driving state are received in the sampling interval in step 100, the driving state monitoring module 64 diagnoses a failed state in driving the solenoid 28 in step 102. When a predetermined number of data samples indicating a non-driving state are not received in step 100, the sampling process goes to step 103 to determine whether the sampling process is still in the sampling interval. When the sampling process is still in the sampling interval in step 103, the second sampling process returns to step 94 to continue sampling. When the sampling interval expires in step 103, the second sampling process goes to step 118.

In the third sampling process, the voltage monitoring module 66 receives data samples related to a voltage level of the driver circuit 52 in step 104. When the data sample indicates a voltage level equal to or above a threshold in step 106, the sampling process returns to step 104 to continue sampling. When the data sample indicates a voltage below a threshold in step 106, a counter counts the number of times the driver circuit 52 has a voltage below the threshold in step 108. When a predetermined number of data samples indicating a voltage level below a threshold are received in the sampling interval in step 110, the voltage monitoring module 66 diagnoses a fault in the boost voltage in step 112. When a predetermined number of data samples indicating a voltage level below a threshold are not received in step 110, the sampling process goes to step 113 to determine whether the sampling process is still in the sampling interval. When the sampling process is still in the sampling interval in step 113, the third sampling process returns to step 104 to continue sampling. When the sampling interval expires in step 113, the third sampling process goes to step 118.

When at least one of the initialization state monitoring module 62, the driving state monitoring module 64 and the voltage monitoring module 66 diagnoses a fault in one of the various states, the fault determination module 68 diagnoses a fault in the driver circuit 52 in step 114. The control module 34 commands, for example only, the fuel injector control module 42, to take remedial action in step 116. The method 80 ends in step 118.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a fuel injector control system, comprising:

an initialization state monitoring module that determines whether a driver circuit for a solenoid is in an initialized state or an un-initialized state in a first sampling interval, and that generates a first fault signal when a first number of times that the driver circuit is in the un-initialized state reaches a first predetermined number;

a driving state monitoring module that determines whether the driver circuit for the solenoid is in a driving state or a non-driving state in a second sampling interval, and that generates a second fault signal when a second number of times that the driver circuit is in the non-driving state reaches a second predetermined number;

a voltage monitoring module that determines whether a voltage level of the driver circuit for the solenoid is less than a desired boost voltage in a third sampling interval, and that generates a third fault signal when a third number of times that the voltage level is less than the desired boost voltage reaches a third predetermined number, wherein the first fault signal, the second fault signal, and the third fault signal are independent signals; and a fault determination module that communicates with the initialization state monitoring module, the driving state monitoring module, and the voltage monitoring module, and that diagnoses a fault in the driver circuit for the solenoid in response to any one of the first fault signal, the second fault signal, and the third fault signal.

2. The diagnostic system of claim 1 further comprising a solenoid control module that initializes the driver circuit for the solenoid to charge the driver circuit to the desired boost voltage and to enter the initialized state.

3. The diagnostic system of claim 2 wherein the driving state is after the initialized state.

4. The diagnostic system of claim 1 wherein at least one of the initialization state monitoring module, the driving state monitoring module, and the voltage monitoring module includes a counter that counts one of the first number of times, the second number of times, and the third number of times, respectively.

5. The diagnostic system of claim 1 wherein the desired boost voltage corresponds to a boost voltage for a fuel injector associated with the solenoid.

6. The diagnostic system of claim 1 wherein the diagnostic system disables at least one of an engine and a fuel injector associated with the solenoid in response to at least one of the first fault signal, the second fault signal, and the third fault signal.

7. A diagnostic method for a fuel injector control system, the method comprising:

determining whether a driver circuit for a solenoid is in an initialized state or an un-initialized state in a first sampling interval;

generating a first fault signal when a first number of times that the driver circuit is in the un-initialized state reaches a first predetermined number;

determining whether the driver circuit for the solenoid is in a driving state or a non-driving state in a second sampling interval;

generating a second fault signal when a second number of times that the driver circuit is in the non-driving state reaches a second predetermined number;

determining whether a voltage level of the driver circuit for the solenoid is less than a desired boost voltage in a third sampling interval;

generating a third fault signal when a third number of times that the voltage level is less than the desired boost voltage reaches a third predetermined number, wherein the first fault signal, the second fault signal, and the third fault signal are independent signals; and diagnosing a fault in the driver circuit for the solenoid in response to any one of the first fault signal, the second fault signal, and the third fault signal.

8. The method of claim 7 further comprising initializing the driver circuit for the solenoid to charge the driver circuit to the desired boost voltage and to enter the initialized state.

9. The method of claim 8 wherein the driving state is after the initialized state.

10. The method of claim 7 further comprising counting at least one of the first number of times, the second number of times, and the third number of times with a counter.

11. The method of claim 7 wherein the desired boost voltage corresponds to a boost voltage for a fuel injector associated with the solenoid.

12. The method of claim 7 further comprising disabling at least one of an engine and a fuel injector associated with the solenoid in response to at least one of the first fault signal, the second fault signal, and the third fault signal.

* * * * *